United States Patent [19]

Elam

[11] 4,262,849
[45] Apr. 21, 1981

[54] HIGH PRESSURE WASHER FOR MINE EQUIPMENT

[76] Inventor: Kenneth R. Elam, 226 Walden Ct., Eureka, Mo. 63025

[21] Appl. No.: 33,578

[22] Filed: Apr. 26, 1979

[51] Int. Cl.³ .............................................. B05B 9/00
[52] U.S. Cl. .................................. 239/175; 105/161; 417/503
[58] Field of Search ............... 417/503; 239/175, 172; 137/571, 544; 105/161

[56] References Cited

U.S. PATENT DOCUMENTS

| | | | |
|---|---|---|---|
| 2,266,125 | 12/1941 | Malsbary | 417/503 |
| 3,372,875 | 3/1968 | Torrey | 239/175 |
| 3,578,882 | 5/1971 | Janssen | 417/503 |
| 4,062,639 | 12/1977 | Conlee | |
| 4,181,139 | 1/1980 | Martini | 137/571 |

OTHER PUBLICATIONS

Hotsy Brochure #880922, 880925; The Hotsy Corp., Englewood, Colorado.

*Primary Examiner*—Robert W. Jenkins
*Attorney, Agent, or Firm*—James R. Bell

[57] ABSTRACT

Abrasive coal dust contaminates and damages equipment used in coal mines. Such equipment must be cleaned periodically to remove any buildup of coal dust. The equipment is usually cleaned in areas with non-explosive atmospheres. The present invention provides a high pressure, mine equipment cleaning device utilizing a water based, non-flammable cleaning solution. The device is carried by a vehicle and is powered by pressure in the hydraulic system of the vehicle.

1 Claim, 3 Drawing Figures

U.S. Patent    Apr. 21, 1981    Sheet 1 of 2    4,262,849
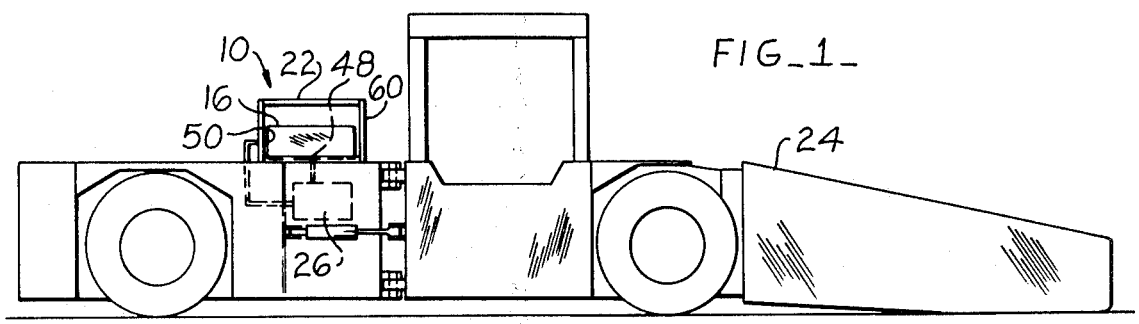
FIG_1_
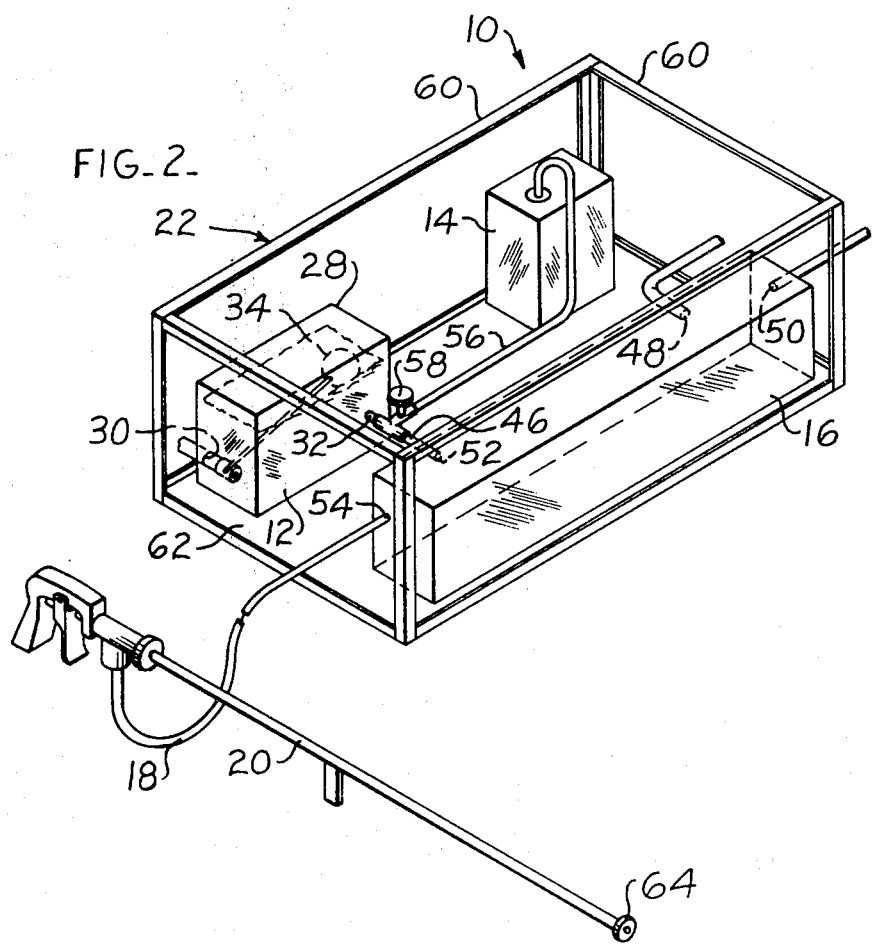
FIG_2_

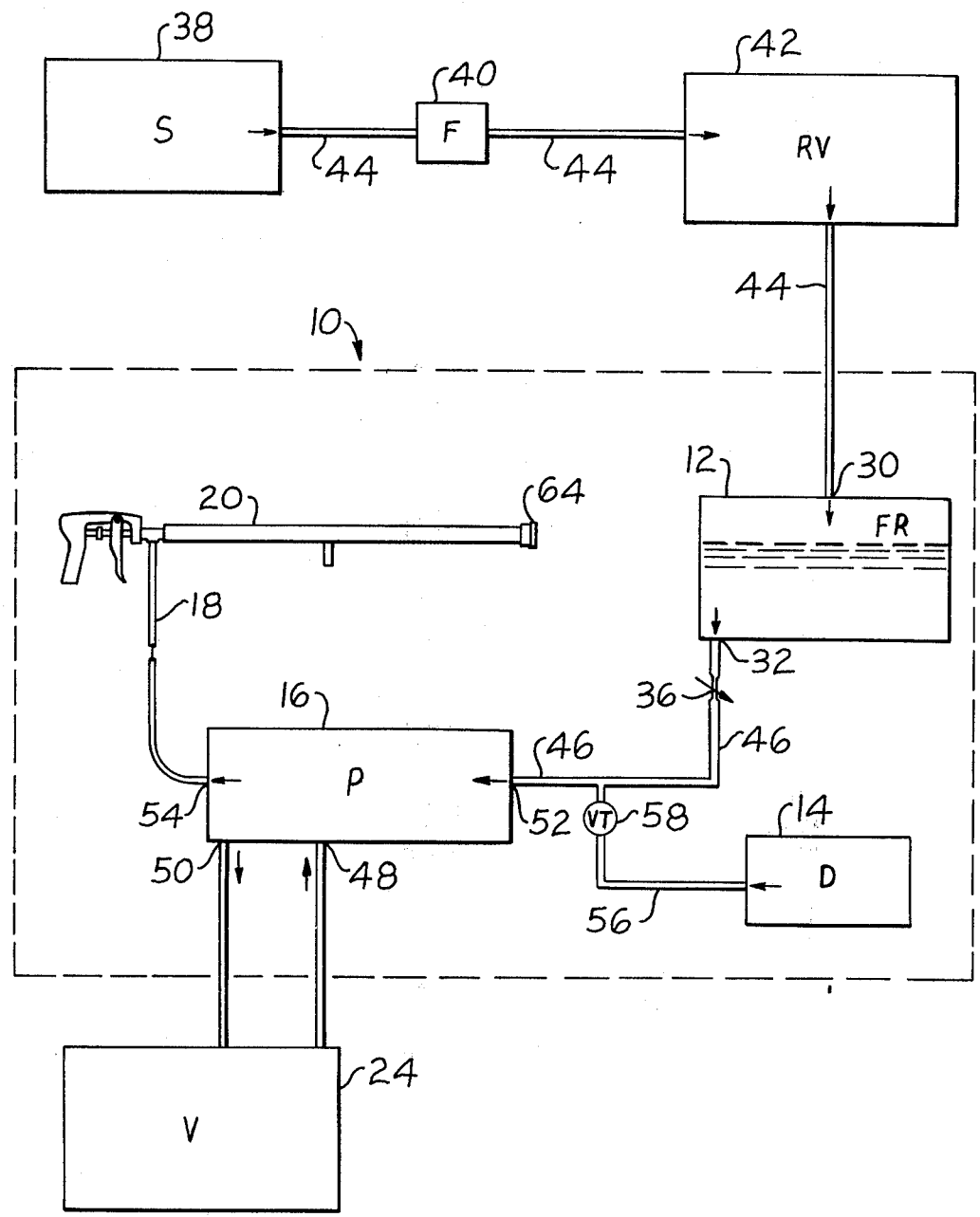

HIGH PRESSURE WASHER FOR MINE EQUIPMENT

TECHNICAL FIELD

This invention relates generally to cleaning and liquid contact with solids and more particularly to movably mounted jet applying nozzles.

BACKGROUND ART

Some vehicles are used in mines. One such vehicle is generally known as a mine scoop. This versitile vehicle has a low profile for mobility within the low-overhead mine tunnels beyond the area generally known as the cross-cut.

The mine scoop has a hydraulic system and as most vehicles, has areas of exposed grease, oil and other moist substances.

Coal dust is prevalent in the atmosphere of the mine shafts. This highly abrasive, fine dust adheres to moist areas on the mine scoop such as around hydraulic lines where hydraulic fluid may have leaked. The coal dust not only adheres to these moist areas but packs and builds a substantial deposit. As a result, expensive damage may occur to the hydraulic hose on the vehicle unless these coal dust deposits are periodically removed.

The existance of the highly explosive atmosphere of the mine beyond the cross-cut requires strong safety measures. For example, cleaning of equipment in this area is usually only done with water. To clean effectively, the scoop must be brought to a less hazardous area where strong cleaning solutions may be used in connection with high pressure cleaning equipment. Portable cleaning equipment is available but, since it is electrically powered, it cannot be used in the areas having a highly explosive atmosphere.

Contamination problems attributed to coal dust are not limited to vehicles but also may do damage to tools and other equipment used in the mine. Cleaning of all such equipment is required.

In view of the above, it would be advantageous to provide a washing device using water and detergent under high pressure for cleaning vehicles and other equipment which overcomes the problems associated with the prior art.

DISCLOSURE OF INVENTION

In one aspect of the present invention, the problems pertaining to the known prior art, as set forth above, are advantageously avoided by the present invention.

This is accomplished by providing a high pressure washer for mine equipment including a reservoir and means for controlling fluid level in the reservoir. A container contains cleaning solution and means are provided for drawing fluid from the reservoir, and cleaning solution from the container, and then ejecting the fluid and cleaning solution under pressure.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:
FIG. 1 is a side view illustrating a mine vehicle carrying the washing device of this invention;
FIG. 2 is an isometric view illustrating the washing device of this invention; and
FIG. 3 is a diagrammatic view illustrating the invention.

BEST MODE FOR CARRYING OUT THE INVENTION

A washing apparatus is generally designated 10 in FIGS. 1-3. The apparatus includes a reservoir 12, a container 14, a pump 16, a hose 18 and a nozzle 20. The apparatus 10 is housed in a rigid housing 22 which is mounted on a vehicle 24 with pump 16 operably connected to the vehicle hydraulic system 26.

Reservoir 12, FIG. 2, is preferably rigid and constructed from sheet metal welded at appropriate joints. A lid or cover 28 is used in conjunction with reservoir 12. An inlet 30 and an outlet 32 are included to permit fluid to enter and exit reservoir 12, respectively.

Means are provided for controlling fluid level in reservoir 12 such as a conventional ball float 34 connected to close inlet 30 when a desired fluid level is attained. Float 34 is thus similar to conventional floats used in reservoir tanks found in toilets. This limits the chance of fluid overflowing reservoir 12.

Outlet 32 includes a restriction 36 such as a reduced diameter orifice which is preferably variable for increasing or decreasing the amount of fluid flow therethrough.

Container 14 contains a cleaning solution. Container 14 is of no particular construction but a preferred cleaning solution is a water soluble, non-flammable, cleaner-degreaser such as the product MINE SOLVE manufactured by the Elam Chemical Company.

A source of cold water 38, FIG. 3, is available in mines and is generally at a pressure of from about 200 psi to about 400 psi. The water is a readily available fluid for reservoir 12. A conventional filter 40 and a pressure reducing valve 42 are used to connect the cold water source 38 and the reservoir 12 through a conduit 44. Preferably, water pressure is reduced to about 55 psi prior to entering reservoir 12. Filter 40 and valve 42 are considered optional, however.

Pump 16 functions as a means for drawing cold water from reservoir 12 and cleaning solution from container 14 via a conduit 46. Pump 16 is preferably a hydraulically operated pump manufactured by the Hotsy Corporation and sold under the name HOTSY STING-RAY 1500. Pump 16 has an inlet 48 for receiving hydraulic fluid from the vehicle hydraulic system 26 and an outlet 50 for returning the hydraulic fluid to the system 26. The vehicle hydraulic system is at a pressure of from about 1800 psi to about 2000 psi. The hydraulic pressure of the vehicle system 26 operates the pump 16.

Another inlet 52, in pump 16 admits cold water from reservoir 12 and cleaning solution from container 14 through conduit 46. The hydraulic pressure of system 26 operates a piston in pump 16, as is well known, for ejecting the cold water and cleaning solution from pump 16 through an outlet 54. Due to the presence of restrictor 36, pump 16 is starved and is caused to draw water from reservoir 12 at a pressure below the working hydraulic pressure of pump 16. As a result, the cleaning solution is sucked or drawn from container 14 via conduit 56. An adjustable or throttling valve 58 at the intersection of conduits 56 and 46 is used to adjust the amount or concentration of cleaning solution combined with the water.

Housing 22 is preferably formed of steel angle members 60 including a steel floor or base 62. The housing 22 is mounted on vehicle 24 which may be a well-known mine vehicle such as S and S MINE SCOOP. It should be kept in mind however that any vehicle having a suitable hydraulic system can make use of the washer of this invention.

The commercially available high pressure hose 18 and nozzle 20 are connected to the pump outlet 54. The nozzle tip 64 can be varied to control the pattern of spray therefrom as it is well-known.

INDUSTRIAL APPLICABILITY

With the parts assembled as set forth above it can be seen that water and cleaning solution are drawn by pump 16 from reservoir 12 and container 14 then ejected from pump 16 at a pressure at about 200 psi below the working hydraulic pressure of pump 16 at a rate of about 4 gallons per minute. The pump 16 is operated by a hydraulic system 26 of a vehicle 24 and the result is a high-pressure, cold water, non-flammable wash usable beyond the cross-cut area of a coal mine for cleaning harmful, abrasive, coal dust accumulation from mine tools and other equipment. This eliminates the time and inconvenience of moving the equipment to some other location for cleaning. Also, this washing apparatus is usable as a self-contained washer for any vehicle having a suitable hydraulic system where a source of water is available.

The foregoing has described a washing device using water and cleaning solution under high pressure for cleaning vehicles and equipment, especially in mines.

Other aspects, objects and advantages of this invention can be obtained from a study of the drawings, the disclosure and the apended claims.

I claim:

1. A washing apparatus in combination with a mine vehicle having a fluid power source comprising:

a rigid housing mounted on the vehicle;

means for containing water, said means being a first reservoir in said housing, said reservoir including a float and being adapted for connection to a water supply external to the vehicle via a filter and a pressure-reducing valve;

means for containing cleaning solution, said means being a second reservoir in said housing;

means for drawing a combined flow of water from said first reservoir, and cleaning solution from said second reservoir, and for ejecting said combined flow under pressure, said means being a pump in said housing, said pump being connected to draw said combined flow through a single inlet having a first conduit connected to said first reservoir and including a first variable restrictor for controlling said water, and having a second conduit, separate from said first conduit, connected to said second reservoir and including a second variable restrictor for controlling said cleaning solution;

said pump operably connected to said fluid power source of said vehicle;

an elongated high pressure hose connected to conduct pressurized combined flow from said pump; and a nozzle connected for directing said pressurized combined flow from said hose.

* * * * *